United States Patent
Liu et al.

(10) Patent No.: US 10,394,693 B2
(45) Date of Patent: *Aug. 27, 2019

(54) QUANTIZATION OF DATA STREAMS OF INSTRUMENTED SOFTWARE

(71) Applicant: SignalFx, Inc., San Mateo, CA (US)

(72) Inventors: Phillip Liu, Palo Alto, CA (US); Arijit Mukherji, Fremont, CA (US); Rajesh Raman, Palo Alto, CA (US); Kris Grandy, San Carlos, CA (US); Jack Lindamood, San Mateo, CA (US)

(73) Assignee: SignalFx, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/799,049

(22) Filed: Oct. 31, 2017

(65) Prior Publication Data
US 2018/0046567 A1 Feb. 15, 2018

Related U.S. Application Data

(63) Continuation of application No. 14/800,679, filed on Jul. 15, 2015, now Pat. No. 9,804,951.

(Continued)

(51) Int. Cl.
| | |
|---|---|
| G06F 11/30 | (2006.01) |
| G06F 11/34 | (2006.01) |
| G06F 11/36 | (2006.01) |

(52) U.S. Cl.
CPC ...... *G06F 11/3644* (2013.01); *G06F 11/3082* (2013.01); *G06F 11/3466* (2013.01); *G06F 2201/865* (2013.01); *G06F 2201/88* (2013.01)

(58) Field of Classification Search
CPC ............. G06F 11/3644; G06F 11/3466; G06F 11/3082

(Continued)

(56) References Cited

U.S. PATENT DOCUMENTS

5,872,909 A 2/1999 Wilner et al.
7,716,530 B2 * 5/2010 Verbowski .......... G06F 11/3466
714/33

(Continued)

FOREIGN PATENT DOCUMENTS

| EP | 0935233 | 8/1999 |
| EP | 1780955 | 5/2007 |
| WO | WO 2014/145092 | 9/2014 |

OTHER PUBLICATIONS

Esmaili, K.S. "Data Stream Processing in Complex Applications," Dissertation, Eidgenossische Technische Hochschule ETH Zurich, 2011, 31 pages, [Online] Retrieved from the Internet<URL:http://e-collection.library.ethz.ch/eserv/eth:4662/eth-46- 62-02.pdf>.

(Continued)

*Primary Examiner* — Duy Khuong T Nguyen
*Assistant Examiner* — Theodore E Hebert
(74) *Attorney, Agent, or Firm* — Fenwick & West LLP

(57) ABSTRACT

A data analysis system processes data generated by instrumented software. The data analysis system receives data streams generated by instances of instrumented software executing on systems. The data analysis system also receives metadata describing data streams. The data analysis system receives an expression based on the metadata. The data analysis system receives data of data streams for each time interval and computes the result of the expression based on the received data values. The data analysis system repeats these steps for each time interval. The data analysis system may quantize data values of data streams for each time interval by generating an aggregate value for the time interval based on data received for each data stream for that time interval. The data analysis system evaluates the expression using the quantized data for the time interval.

19 Claims, 7 Drawing Sheets

Related U.S. Application Data

(60) Provisional application No. 62/061,616, filed on Oct. 8, 2014, provisional application No. 62/094,935, filed on Dec. 19, 2014, provisional application No. 62/109,308, filed on Jan. 29, 2015.

(58) Field of Classification Search
USPC .......................................................... 717/130
See application file for complete search history.

(56) References Cited

U.S. PATENT DOCUMENTS

| | | | |
|---|---|---|---|
| 7,886,281 B2* | 2/2011 | Smith | G06F 11/3636 714/37 |
| 7,979,245 B1 | 7/2011 | Bourlatchkov et al. | |
| 8,095,917 B2* | 1/2012 | Stall | G06F 11/3664 717/130 |
| 8,117,175 B1 | 2/2012 | Johnson et al. | |
| 8,136,124 B2* | 3/2012 | Kosche | G06F 11/3447 714/47.1 |
| 8,176,480 B1* | 5/2012 | Spertus | G06F 8/443 717/127 |
| 8,381,039 B1 | 2/2013 | Osiecki et al. | |
| 8,396,886 B1* | 3/2013 | Tsimelzon | G06F 17/30516 707/769 |
| 8,504,733 B1 | 8/2013 | Iyer et al. | |
| 9,578,372 B2 | 2/2017 | Xu et al. | |
| 9,760,353 B2 | 9/2017 | Raman et al. | |
| 9,804,830 B2 | 10/2017 | Raman et al. | |
| 9,846,574 B2 | 12/2017 | Raman et al. | |
| 9,846,632 B2 | 12/2017 | Liu et al. | |
| 2003/0093772 A1* | 5/2003 | Stephenson | G06F 11/3612 717/130 |
| 2005/0055322 A1 | 3/2005 | Masters et al. | |
| 2005/0125710 A1* | 6/2005 | Sanghvi | G06F 11/0754 714/39 |
| 2005/0223368 A1* | 10/2005 | Smith | G06F 11/3636 717/128 |
| 2006/0133428 A1* | 6/2006 | Guthrie | H04L 43/0858 370/519 |
| 2006/0293777 A1 | 12/2006 | Breitgand et al. | |
| 2007/0169055 A1* | 7/2007 | Greifeneder | G06F 11/3476 717/158 |
| 2008/0127149 A1* | 5/2008 | Kosche | G06F 8/443 717/158 |
| 2009/0249308 A1* | 10/2009 | Li | G06F 11/3676 717/132 |
| 2009/0271529 A1* | 10/2009 | Kashiyama | G06F 17/30477 710/1 |
| 2009/0287729 A1* | 11/2009 | Chen | G06F 11/3676 |
| 2010/0057735 A1 | 3/2010 | Srinivasan et al. | |
| 2010/0293535 A1* | 11/2010 | Andrade | G06F 8/433 717/156 |
| 2011/0302164 A1 | 12/2011 | Krishnamurthy et al. | |
| 2012/0017002 A1* | 1/2012 | Andreasson | H04L 43/0811 709/231 |
| 2012/0158925 A1 | 6/2012 | Shen et al. | |
| 2013/0179868 A1* | 7/2013 | Greifeneder | G06F 11/3624 717/130 |
| 2013/0246746 A1* | 9/2013 | Gainey, Jr. | G06F 9/3005 712/205 |
| 2013/0246771 A1* | 9/2013 | Farrell | G06F 9/3005 712/227 |
| 2013/0247012 A1* | 9/2013 | Gainey, Jr. | G06F 11/3644 717/130 |
| 2013/0263093 A1 | 10/2013 | Brandt et al. | |
| 2013/0283102 A1 | 10/2013 | Krajec et al. | |
| 2013/0290450 A1 | 10/2013 | Butler et al. | |
| 2014/0006325 A1 | 1/2014 | Biem | |
| 2014/0019598 A1* | 1/2014 | Krajec | H04L 67/1002 709/220 |
| 2014/0040213 A1 | 2/2014 | Rossi | |
| 2014/0059210 A1 | 2/2014 | Gedik et al. | |
| 2014/0095541 A1* | 4/2014 | Herwadkar | G06F 17/30442 707/774 |
| 2014/0195861 A1 | 7/2014 | Singh et al. | |
| 2014/0215443 A1 | 7/2014 | Voccio et al. | |
| 2014/0282416 A1* | 9/2014 | Shepherd | G06F 11/3644 717/125 |
| 2014/0350888 A1 | 11/2014 | Gesmann | |
| 2015/0286548 A1 | 10/2015 | Juli | |
| 2016/0103665 A1* | 4/2016 | Liu | G06F 11/3644 717/158 |
| 2016/0103757 A1* | 4/2016 | Liu | G06F 11/3644 717/130 |
| 2016/0179488 A1* | 6/2016 | Raman | G06F 8/443 717/158 |
| 2016/0179588 A1* | 6/2016 | Raman | G06F 8/443 719/318 |
| 2016/0179799 A1* | 6/2016 | Raman | G06F 8/443 707/822 |
| 2016/0266728 A1 | 9/2016 | Sankhavaram et al. | |
| 2017/0147417 A1 | 5/2017 | Sasturkar et al. | |

OTHER PUBLICATIONS

PCT International Search Report and Written Opinion, PCT Application No. PCT/US2015/051458, dated Dec. 17, 2015, 21 pages.

Zhang, D. et al., "Temporal Aggregation Over Data Streams Using Multiple Granularities," Advances in Database Technology—EDBT 2002, vol. 2287 if the series Lecture Notes in Computer Science, Mar. 14, 2002, pp. 646-663, [Online]. Retrieved from the Internet<URL:http://www.zgking.com:8080/home/donghui/publications/hta.-pdf>.

Abadi, D. et al., "The Design of the Borealis Stream Processing Engine," Proceedings of the 2005 CIDR Conference, 2005, 13 pages.

Bai, Y. et al., "A Data Stream Language and System Designed for Power and Extensibility," CIKM '06, ACM, Nov. 5-11, 2006, 10 pages.

Cherniack, M. et al., "Scalable Distributed Stream Processing," Proceedings of the 2003 CIDR Conference, 2003, 12 pages.

Jain, N. et al., "Towards a Streaming SQL Standard," VLDB '08, Aug. 24-30, 2008, 12 pages.

PCT International Search Report and Written Opinion, PCT Application No. PCT/US2016/014957, dated Apr. 21, 2016, 30 pages.

PCT Invitation to Pay Additional Fees, PCT Application No. PCT/US15/66132, dated Feb. 22, 2016, 2 pages.

PCT International Search Report and Written Opinion, PCT Application No. PCT/US15/66132, dated Apr. 21, 2016, 17 pages.

Stonebraker, M. et al., "The 8 Requirements of Real-Time Stream Processing," ACM SIGMOD Record, 2005, 6 pages.

Thies, W. et al., "StreamIt: A Language for Streaming Applications," Lecture Notes in Computer Science, Mar. 28, 2002, pp. 179-196, vol. 2304.

Xu, W. et al., "A Flexible Architecture for Statistical Learning and Data Mining from System Log Streams," In Proceedings: Temporal Data Mining, Algorithms, Theory and Applications, IEEE, 2004, May be retrieved from the Internet at<URL:http://research.microsoft.com/pubs/143357/paper.pdf>.

Canadian Office Action, Canadian Application No. 2,962,760, dated Feb. 6, 2018, 3 pages.

Canadian Intellectual Property Office, CA Patent Application No. 2,962,760, dated Jan. 24, 2019, four pages.

European Patent Office, European Extended Search Report, European Application No. 15848505.2, dated Jul. 9, 2018, 9 pages.

European Patent Office, European Extended Search Report, European Application No. 16743976.9, dated Jul. 9, 2018, 9 pages.

European Patent Office, European Extended Search Report, European Application No. 15870999.8, dated Aug. 21, 2018, 9 pages.

Gedik, B. et al., "SPADE: The System S Declarative Stream Processing Engine," SIGMOD'08, Jun. 9-12, 2008, pp. 1123-1134.

* cited by examiner

QUANTIZATION OF DATA STREAMS OF INSTRUMENTED SOFTWARE

CROSS REFERENCE TO RELATED APPLICATIONS

This application is a continuation of U.S. application Ser. No. 14/800,679, filed on Jul. 15, 2015, which claims the benefits of U.S. Provisional Application No. 62/061,616, filed on Oct. 8, 2014, U.S. Provisional Application No. 62/094,935 filed on Dec. 19, 2014, and U.S. Provisional 62/109,308 filed on Jan. 29, 2015, each of which is incorporated by reference in its entirety.

BACKGROUND

The disclosure relates to instrumentation of software in general and more specifically to generating regular data streams with data values occurring at fixed time intervals from irregular data streams generated by instrumented software.

Software developers monitor different aspects of software they develop by instrumenting the code. These include performance of the software, errors encountered during execution of the software, significant events encountered during execution of the software, information describing which parts of code are being executed and which parts are not being executed, and so on. Conventional techniques for instrumenting code include statements in the code that log different types of information to log files or print information on screens. This type of instrumentation is suitable for simple applications, for example, applications having a simple flow of execution that execute on a single processor. However, these techniques for instrumenting software are inadequate for complex applications that may be distributed across multiple systems, each system executing multiple processes or threads of execution.

One technique conventionally used for instrumenting such complex systems is to use help of experts in instrumenting code. Certain vendors provide expert services that help with instrumentation of code. However, these vendors typically provide standard services that are often not very flexible. Furthermore, these vendor based solutions have significant overhead in terms of time needed by the vendor to instrument code. Accordingly, these solutions are suited towards a slow development cycle, for example, a year-long development cycle. However, software development and release cycles for software products have become short. For example, there are several online systems in which software developers make changes on a monthly, weekly, or even daily basis and deploy them. Due to the significant overhead of vendor based instrumentation solutions, developers find it difficult to use these services in a fast paced development environment.

Furthermore, conventional techniques for instrumenting code cause significant delays in assimilating the information, storing the information, and analyzing the information to generate reports. As a result, there can be significant delay between the time that a problem occurs in the software and the time that the problem is detected via instrumentation of the code. Accordingly, conventional systems for generating reports based on instrumentation of software are often inadequate in fast paced development cycles of complex applications.

SUMMARY

Described embodiments process data streams generated by instrumented software. Software developers include instructions in software being developed for instrumenting the software. A system receives data streams generated by instances of the instrumented software. Data streams provide values of metrics generated by instrumented software. The instrumented software generates the values at variable time intervals. For example, a metric may be reported when a particular instruction is executed in response to requests from clients. Since client requests may be received arbitrarily, the software reports the metric at variable time intervals. The system generates quantized data streams corresponding to each input data stream. The quantized data stream has data values occurring periodically at fixed time intervals. The system identifies a function for aggregating the metric for which values are provided by the input data streams. The system generates the quantized data streams by determining an aggregate value for each input data stream for each fixed time interval by applying the identified function over data values of the input data stream received within the fixed time interval. The system further receives a request to evaluate an expression based on the data values from the input data streams. The system periodically evaluates the expression using the data values of the quantized data streams.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
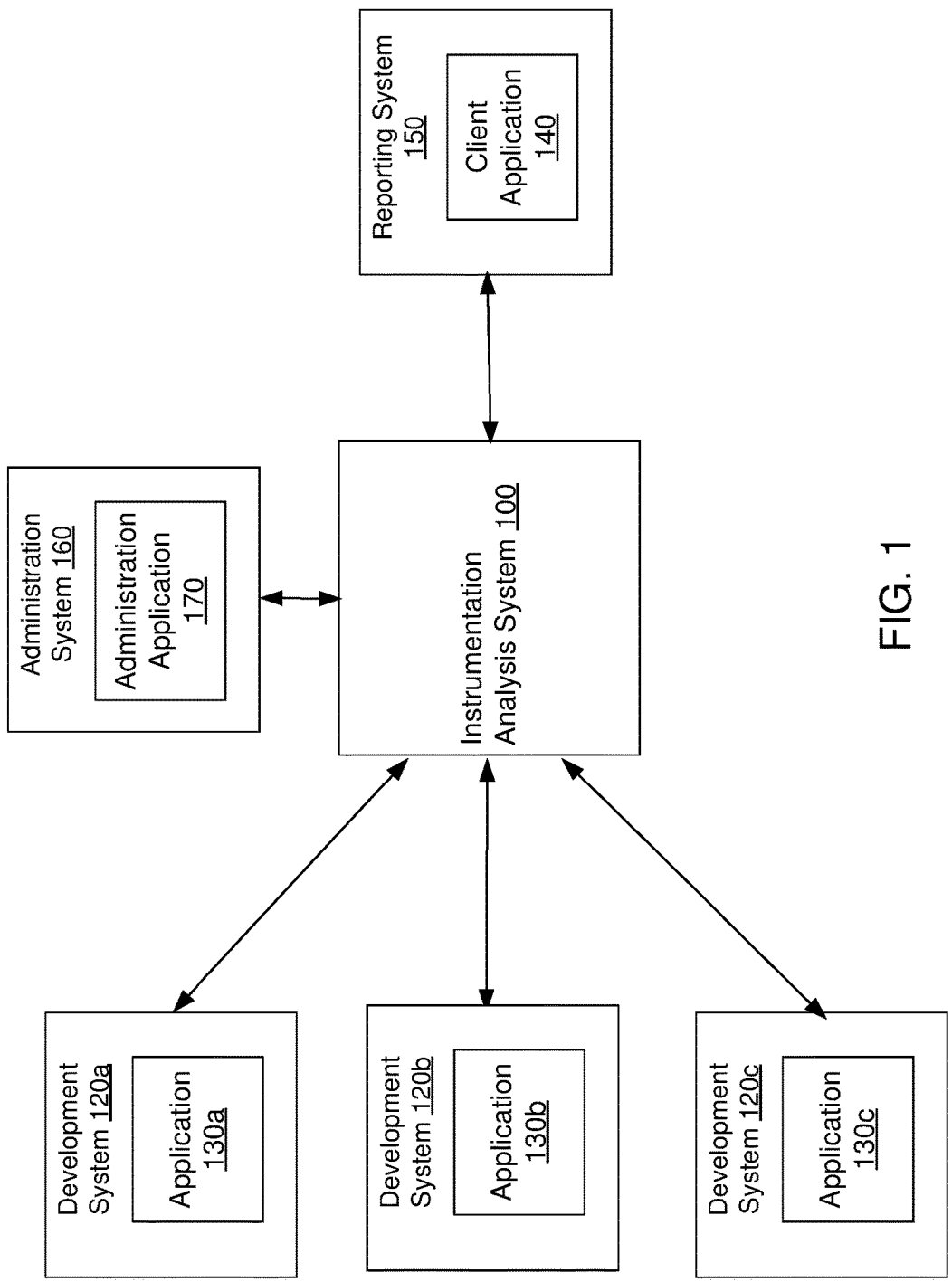
FIG. 1 shows the overall system environment for reporting based on instrumented software, according to an embodiment.

FIG. 1 shows the overall system environment for reporting based on instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different development systems 120 (the instrumentation analysis system 100 may also be referred to herein as an analysis system or a data analysis system; a development system may also be referred to herein as an external system). A development system 120 executes software that has been instrumented, for example, application 130. Although, application 130 is shown in FIG. 1 as an example of instrumented software, the techniques disclosed herein are not limited to application software but are applicable to other kinds of software, for example, server software, software executing on client devices, websites, and so on.

The software executing on a development system 120 is configured to send information generated as a result of instrumenting the software to instrumentation analysis system 100. For example, the application 130 may send data periodically to instrumentation analysis system 100. Different applications 130 may send the same metric or different metrics at different rates. The same application may send different metrics at different rates. An application sends data in the form of data stream (or data streams) to the instrumentation analysis system 100. Data streams are also referred to herein as time series. The application 130 sends data to the instrumentation analysis system 100 by invoking application programming interface (API) supported by the instrumentation analysis system 100.

The application 130 (or any other software) may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase monotonically or the counter value may decrease monotonically. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system 100 are invoked by the application 130 to periodically send the current value of the counter to the instrumentation analysis system 100.

Following is an example of instrumented code of an application 130. The following instruction included in the code being instrumented creates a counter object for tracking count of an action or entities.

counter1=createCounter(source="web1",
        metric="metric1");

The above instruction creates a counter object and assigns it to the variable counter1. The instruction to create the counter also specifies one or more attribute values. For example, the above createCounter instruction specifies a source attribute and a metric attribute. The value of the source attribute is specified to be "web1" and the value of the metric attribute is specified to be "metric1." In other words, the counter object is associated with a source "web1" and metric "metric1." The counter object created by the application 130 acts as a source of a data stream that the application 130 sends to the instrumentation analysis system 100. In an embodiment, the source and the metric values uniquely identify the data stream associated with the counter (or a gauge). In other embodiments, more or fewer key value pairs may be used to uniquely identify a data stream. For example, multiple servers may send a data stream associated with a source "web1" and metric "metric1" however each data stream may be uniquely identified by further associating the data stream with information identifying the server, for example, an IP (internet protocol) address of the server or a unique name of the server.

Values of one or more of the attributes specified during creation of a counter are received when tuples representing values of the counter are sent by the instrumented code of application 130 to the instrumentation analysis system 100. For example, the source and metric values are received with each tuple of values received in the data stream along with the data value being reported. Optionally the tuple of values may include a timestamp, for example, the timestamp when the data value being reported was captured by the instrumented software.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A counter defined in the instrumented code may reset itself periodically. For example, the counter may be reset after a specific time interval that is configurable. In this case, the counter values received may not increase (or decrease) monotonically since the value may be reset at the end of an interval. A counter may be cumulative, i.e., the counter does not reset (unless explicit instruction is provided to reset it.) In this situation, the values of the cumulative counter change monotonically, i.e., increase (or decrease) monotonically unless explicitly reset by a user.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata.

The metadata includes attributes describing data streams that may be distinct from the attributes that are received as part of the data stream itself. For example, the data stream may provide data values of attribute such as cache hits, cache misses, memory usage, and so on. Whereas the metadata may specify attributes such as data center in which the data stream is being executed, the branch of an organization associated with the data stream, and so on. The metadata attributes may also be received from a source that is different from the source of the data stream. For example, the data streams may be received from developments systems 120 whereas the metadata attribute values may be specified by a system administrator using the administration system 160.

The ability to specify metadata independent of the data received for the data stream allows the application 130 to be instrumented with lesser amount of information sent with each data stream. More specifically, several attributes may be associated with the data stream using the metadata but only some of the attributes associated with the data stream are sent as tuples by the instrumented software. This reduces the amount of overhead introduced in the application 130 as a result of instrumenting the code.

Typically, the metadata attributes associated with a data stream are static compared to attributes that are received in the data stream that change dynamically. Although the metadata attributes can also change, they change less frequently compared to the attributes received with the data stream. For example, a server may be assigned from one part of the organization to another part of the organization, thereby causing a metadata attribute describing the part of organization associated with the data streams sent by that server to change. However, these changes are less frequent compared to the attributes received with the data stream that can change values every second or every millisecond or more frequently.

The ability to specify metadata describing data streams independently from the data received from each data stream provides several benefits in generating reports based on the data stream. As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

This provides for a new paradigm for instrumenting software since the developers do not need to consider the types of reports that will be generated from the instrumented data while instrumenting the software. The developers simply instrument their software to generate raw data independent of the metadata attributes. The metadata attributes can be specified independent of the data of the data stream. The reporting system 150 can use the metadata attributes to combine the data of the data streams in various ways to generate reports. For example, the raw data may present load on each server every second. The instrumentation analysis system 100 can aggregate the load on each server grouped by datacenter (which is a metadata attribute specified independent of the sources of data streams) and computed as the data streams are arrived. The resulting report may be presented in real time, i.e., updated as the data of the data streams is received.

Furthermore, persons that are experts at generating reports based on the instrumented software can be different from the software developers. For example, an expert at data analysis who is not a developer can define the metadata for the data streams and generate reports without being involved in the development process. This is a significant improvement over conventional techniques for instrumenting software that require metadata to be encoded in the instrumented code. This is so because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130. Furthermore new metadata can be defined for data streams that were previously received. Accordingly, a new report can be generated that is based on data that is being received as data streams as well as data that was previously stored (before the metadata associated with the data stream). For example, report providing a moving average over a large time interval can be generated. This report computes the moving average based on data that is currently being received as well as data that was previously received (before the metadata used in the report was associated with the data). And furthermore, these new reports can be defined without having to modify the instrumented software (by re-instrumenting the software) or having to re-deploy the instrumented software.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100. The report may be generated by the instrumentation analysis system 100 and sent for presentation via the reporting system 150.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

System Architecture of the Instrumentation Analysis System

Figure 2:
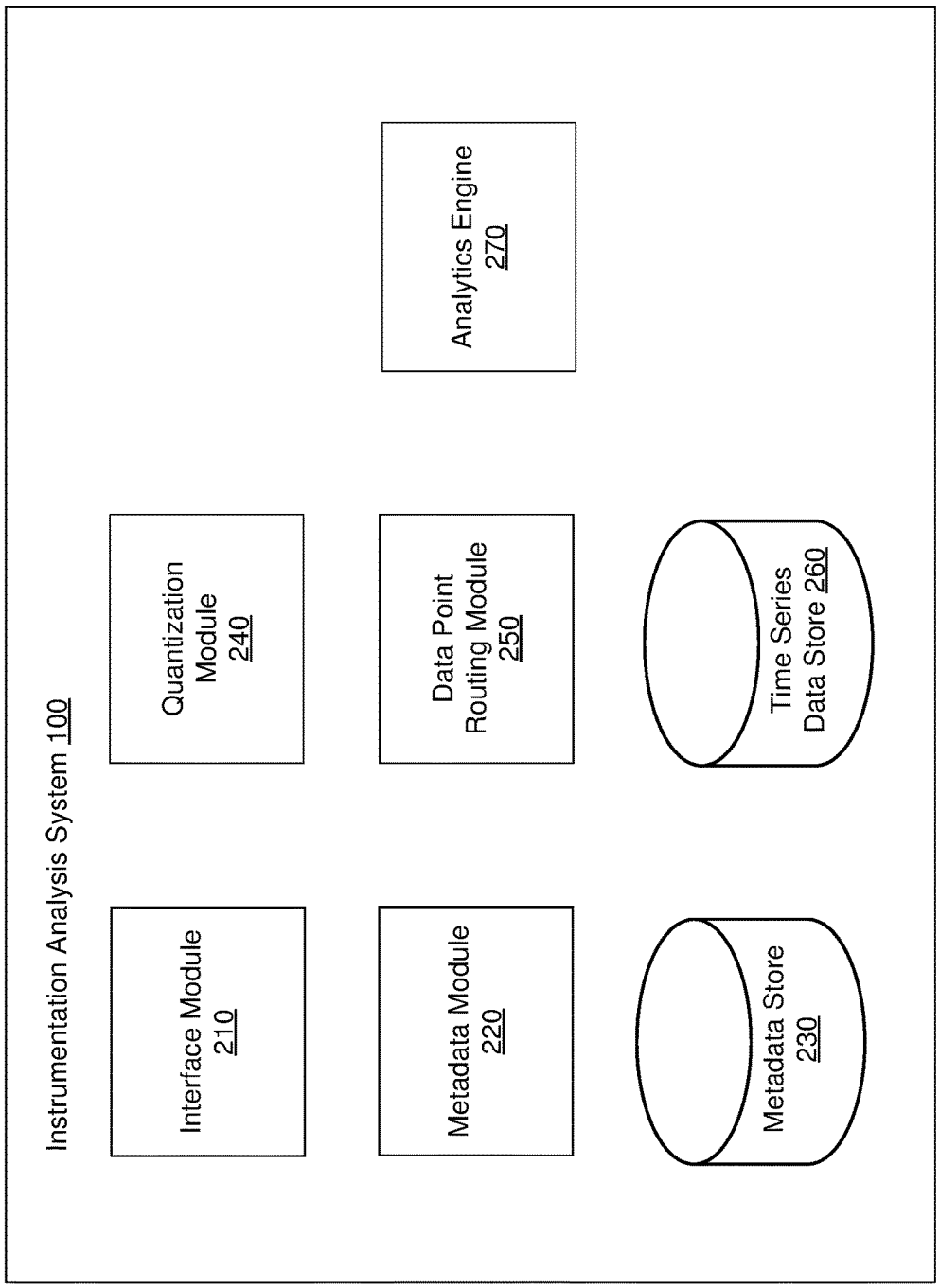
FIG. 2 shows the architecture of a system for reporting based on instrumented software, according to an embodiment.

FIG. 2 shows the system architecture of the instrumentation analysis system 100, according to an embodiment. The instrumentation analysis system 100 includes an interface module 210, a quantization module 240, metadata module 220, metadata store 230, a data point routing module 250, an analytics engine 270, and a time series data store 260. In other embodiments, the instrumentation analysis system 100 may include other modules not described herein. Functionality indicated as provided by a particular module may be implemented by other modules instead.

The interface module 210 receives requests from external systems, for example, development system 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210. In an embodiment, the interface module 210 supports APIs that allow developer systems 120 to perform various actions associated with data streams, for example, registering a data stream, providing tuples representing data values of the data stream, specifying attributes associated with a data stream (for example, to add new attributes), and so on.

The interface module 210 receives data in the form of a data stream from a development system 120. The interface module 210 receives data and represents it as tuples. A tuple of data received by the interface module comprises various elements including a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data. In an embodiment, the timestamp associated with a tuple represents the time that the data value was received by the instrumentation analysis system 100.

The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a tsid or TSID). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input data stream in which data is available at arbitrary time intervals to a data stream in which data is available at regular time intervals. For example, the data values received in an input data stream may occur at irregular interval that may change from one consecutive pair of data values received to the next pair of data values received. However, the quantization module 240 processes the data of the data stream to generate a data stream with data occurring periodically (at regular time intervals), such as every second, or every 5 seconds, or every 15 seconds, and so on. This process is referred to herein as quantization of the data stream or time series. In an embodiment, the interface module 210 creates multiple threads or processes, each thread or process configured to receive data corresponding to a data stream. Each thread or process invokes the quantization module 240 to perform quantization of the data received for each data stream for each time interval.

The analytics engine 270 evaluates reports specifying expressions based on attributes that are received with the data stream and/or attributes that are specified as part of the metadata. The expression may be based on various operations, for example, aggregations and transformations. In an embodiment, the expression aggregates an attribute value received with the data stream over subsequent time intervals.

The attributes associated with an attribute may be considered as belonging to two sets, a first set of attributes for which values are provided as part of the data of the data stream and a second set of attributes for which data values are specified as part of the metadata and stored in the metadata store 230. An expression processed by the analytics engine 270 may be based on attributes of the first set and attributes of the second set. In other words, the expression may be based on attributes for which values are received with the data stream as well as attributes specified as part of the metadata. An example expression may compute sum of an attribute value received with the data stream such that the aggregate values are grouped over a metadata attribute. For example, if the data stream sends load of server every second for several servers of an organization and there is a metadata attribute "datacenter" associated with each server, an expression may determine average load of servers grouped over data centers.

The instrumentation analysis system 100 periodically determines the value of the input expression and sends the result for display, for example, via a client application such as a browser application executing on a client device. The expression may be obtained by composing various functions including aggregations and transformations in various ways as well as by composing other previously defined expressions. In an embodiment, the analytics engine 270 parses the expressions, generates an executable representation of the program, and executes the generated representation.

The analytics engine 270 may generate a plurality of output data streams as a result of evaluation of an expression. For example, assume that the analytics engine 270 receives and evaluates expression aggregates an attribute value received in the data streams across all input data streams associated with an organization and groups them aggregate value over a metadata attribute "datacenter." Accordingly, the analytics engine 270 generates as many output data streams as there are distinct values of the "datacenter" attribute. Furthermore, the number of output data streams generated by the analytics engine 270 can change from one time interval to another. For example, if a new data center is added to the organization and becomes active, the number of output data streams can increase as a result of addition of the new data center. Similarly, if servers of an existing data center are shutdown, the number of output data streams can decrease for subsequent time intervals. Accordingly, the analytics engine 270 may generate a dynamically changing number of output streams as a result of evaluating the same expression over different time intervals. The changes to the number of output streams may occur as a result of changes to the number of input data streams over subsequent time intervals or as a result of changes to the data values received in the same set of data streams over subsequent time intervals.

The metadata module 220 receives and stores metadata information describing various data streams received from the development systems 120. In an embodiment, the metadata stored in the metadata module 220 is received from a user, for example, a system administrator interacting with the instrumentation analysis system 100 via the client administration application 170 of the administration system 170. The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata datastore 230 stores indexes that map various tags (i.e., properties or name-value pairs) to sets of time series identifier values.

The metadata store 230 may modify a metadata object based on instructions received. For example, the metadata store 230 may modify, add or delete some properties represented by a metadata object. Alternatively, the metadata store 230 may modify the mapping from a metadata object to a data stream based on instructions received. For example, the metadata store 230 may associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series identifiers identifying data streams. Other database tables may store the properties associated with each metadata object as a mapping from metadata object ID to each property represented as a name-value pair. A property is also referred to herein as metadata tag or a tag.

The time series data store 260 stores data streams received from various sources, for example, development systems 120. In an embodiment, the time series data store 260 also stores the data streams after the data is quantized. The time series data store 260 may also store output data streams generated by the analytics engine 270 as a result of evaluating expressions. For example, if an expression results in generation of plurality of data streams, the analytics engine 270 determines a tsid for each of these output data streams and stores each output data stream in the time series data store 260.

The time series data store 260 may also store rollup data for each data stream. The time series data store 260 also stores results of various analytics requests, for example, results of various reports requested by user. The analytics engine 270 computes results for certain reports, for example, moving averages over intervals of time by combining data stored in the time series data store 260 with data obtained as data stream from various sources in real time.

Metadata Representation

Figure 3:
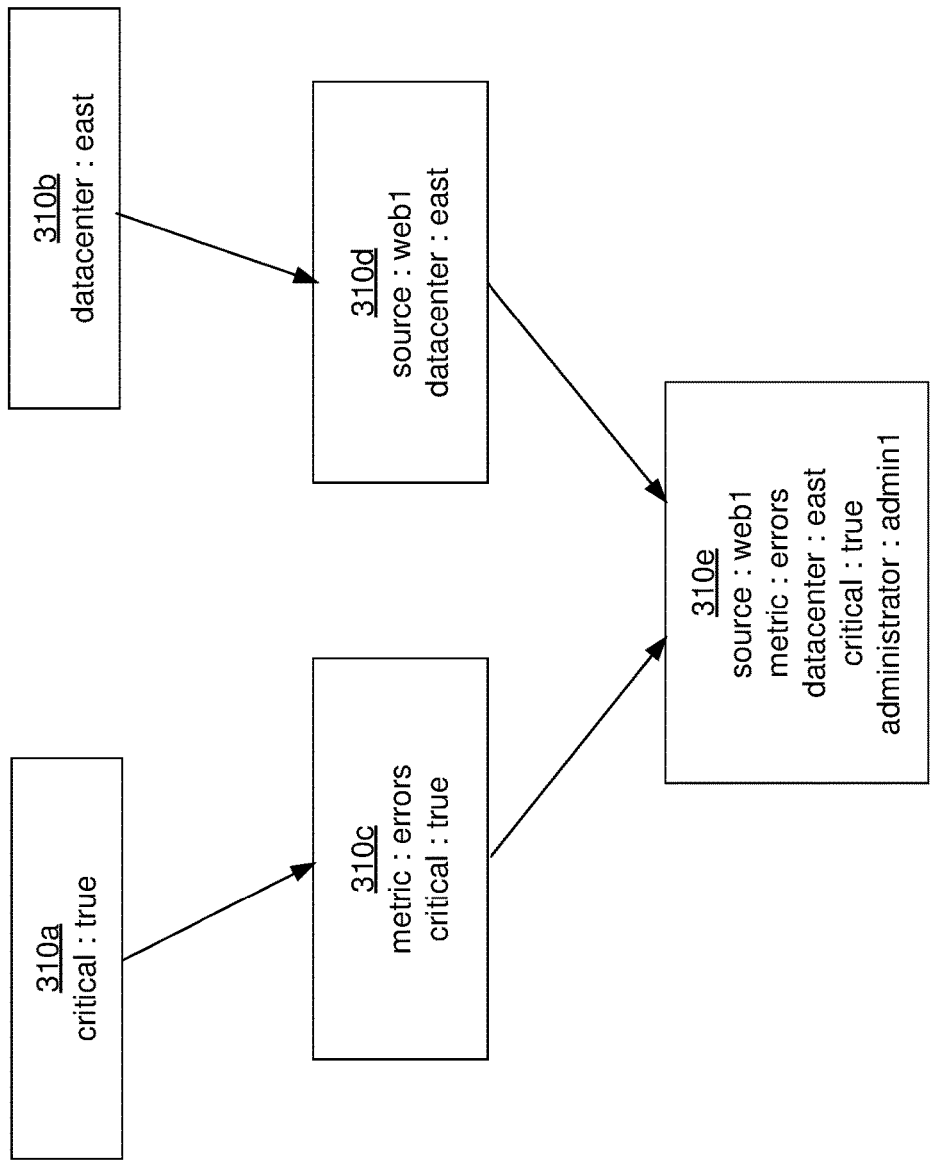
FIG. 3 shows an example hierarchy of metadata objects specified in association with data streams received from executing instances of instrumented software, according to an embodiment.

In an embodiment, the metadata objects are organized in a hierarchical fashion, thereby allowing reuse of metadata definitions as well as ease in modifying the metadata definitions. FIG. 3 shows an example hierarchy of metadata objects specified in association with data streams received from executing instances of instrumented software, according to an embodiment. As shown in FIG. 3, each metadata object 310 represents a set of properties. Some of the metadata objects may be defined in the instrumentation analysis system 100 so that they are available to all users of the system. Other metadata objects may be defined by users, for example, by an enterprise that uses the instrumentation analysis system 100 for generating reports for instrumented software.

The metadata objects shown in FIG. 3 are organized as a hierarchy. Accordingly, metadata object 310a is above the metadata object 310c in the hierarchy, metadata object 310b is above the metadata object 310d in hierarchy, and metadata objects 310a, 310b, 310c, and 310d are all above the metadata object 310e.

A metadata object includes (i.e., inherits) properties of object above the metadata object in the hierarchy. For example, metadata object 310c inherits property "critical:true" from metadata object 310a, metadata object 310d inherits property "datacenter:east" from metadata object 310b, and metadata object 310e inherits properties "source:web1," "datacenter:east," "metric:errors," and "critical:true" from metadata objects that are above the metadata object 310e.

A metadata object may define additional properties in addition to the properties inherited from metadata objects above the metadata object in the hierarchy. For example, metadata object 310c defines "metric:errors" in addition to the property "critical:true" inherited from metadata object 310a and metadata object 310d defines "source:web1," in addition to the property "datacenter:east," inherited from metadata object 310b, and metadata object 310e defines a new property "administrator:admin1" in addition to the properties inherited from the metadata objects above the metadata object 310e in the hierarchy. However, the metadata object does not have to define additional properties other than those inherited from metadata objects above that metadata object in the hierarchy.

In an embodiment, metadata objects having the source and metric attributes are also referred to as metric time-series objects (MTS objects). An MTS metadata object is uniquely identified based on the metric and source values. Accordingly, the metric and source values form a key (e.g., a primary key) for uniquely identifying the MTS object. Any tuple of values defining a data point of a data stream can be associated with an MTS object based on the source and metric values of the tuple. In an embodiment, an MTS object X has the set of properties obtained by taking a union of all the sets of properties of metadata objects above the metadata object X in the hierarchy. The metadata objects such as 310a and 310b that do not specify a source and metric value act as abstract objects for specifying sets of properties (these metadata objects are also referred to as tags).

A data stream is characterized by a set of properties. The data stream is associated with the metadata object having matching properties. Multiple instances of a metadata object may be created, one for each data stream that has the matching set of properties. The properties allow the instrumentation analysis system 100 to query MTS objects that satisfy certain criteria based on key value pairs. For example, given a set of key value pairs, the instrumentation analysis system 100 can identify all data streams that match the given set of key value pairs. The data points from these matching data streams may be provided to an analytics job that evaluates certain expressions based on these data points.

Figure 4:
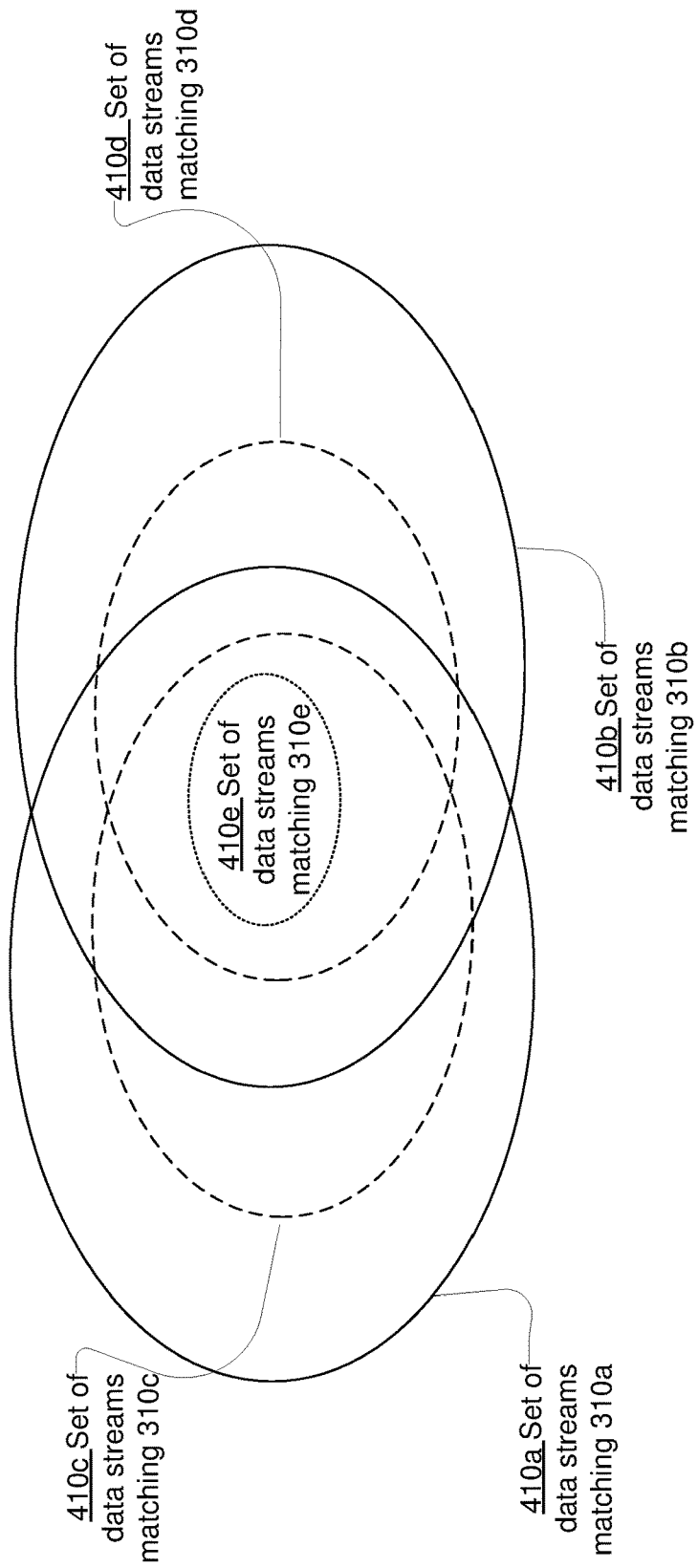
FIG. 4 shows sets of data streams associated with a hierarchy of metadata objects, according to an embodiment.

FIG. 4 shows sets of data streams associated with the hierarchy of metadata objects shown in FIG. 3, according to an embodiment. The hierarchy of metadata objects shown in FIG. 3 is illustrated using the corresponding sets of data streams shown in FIG. 4. Assume that each elliptical shape shown in FIG. 4 represents a set 410 of data streams. Furthermore, any set 410x (where x represents a variable that can take values 'a', 'b', 'c' etc.) shown in FIG. 3 corresponds to a metadata object 310x shown in FIG. 3. For example, set 410a corresponds to metadata object 310a, set 410b corresponds to metadata object 310b, set 410c corresponds to metadata object 310c, and so on.

Note that a metadata object 410 may not be associated with any data stream, for example, a metadata object may be added as a modeling construct that is not associated with any data stream available at the time the metadata object was added. However, the mapping from metadata objects 410 to data streams may be modified. For example, elements may be added to a set of data streams associated with a metadata object or removed from the set. Accordingly, even if a metadata object is not associated with any data stream when the metadata object is added to the metadata store 230, the metadata object may be associated with one or more data streams at a later stage.

As shown in FIG. 4, set 410a represents all data streams associated with metadata object 310a and therefore having a property name "critical" having value "true." A user, for example, a system administrator may assign data streams to a metadata object using the administration system 160. For example, a system administrator may determine all data streams determined to be critical for the operation of the enterprise and associate them with the metadata object 310a.

As another example, set 410b represents all data streams associated with metadata object 310b and therefore having a property name "datacenter" having value "east." As mentioned above, a system administrator can determine instances of instrumented software executing in a datacenter marked "east" and associate them with the metadata object 310b. Alternatively, a script or an automated process may be executed to identify instances of instrumented software that satisfy particular criteria corresponding to properties of a metadata object. For example, a crawler may be executed to identify all servers executing in datacenter "east" and associate them with metadata object 310b.

Set 410c represents all data streams associated with the properties "critical:true" and "metric:errors." Accordingly, set 410c is a subset of all data centers of set 410a. This is so because there may be additional data streams that satisfy "critical:true" but do not satisfy "metric:errors." Note that the sets 410a and 410b may include some overlapping data streams but are not required to. Similarly, sets 410c and 410d may include some overlapping data streams but are not required to. As shown in FIG. 4, the sets 410a and 410b include some overlapping data streams and similarly, sets 410c and 410d include some overlapping data streams. The set 410e includes a subset of the intersection set of sets 410c and 410d since it defines a property "administrator "admin1" in addition to the inherited properties. If set 410e did not define properties in addition to the inherited properties, the set 410e would be the intersection set of sets 410c and 410d.

In general a set corresponding to a metadata object X is the intersection of sets corresponding to the metadata objects above the metadata object X in the hierarchy if the metadata object X does not define any new properties in addition to the inherited properties. Furthermore, a set corresponding to a metadata object Y may be a subset of the intersection of sets corresponding to the metadata objects above the metadata object Y in the hierarchy if the metadata object Y defines new properties in addition to the inherited properties.

In some embodiments, the instrumentation analysis system 100 receives mapping from some metadata objects to sets of data streams. The metadata module 220 determines the elements of a set of data streams associated with a metadata object based on sets of data streams mapped to other metadata objects below the metadata object in the hierarchy. For example, the metadata module 220 determines the set of all data streams associated with a metadata object based on the union of sets of data streams mapped to metadata objects below the metadata object in the hierarchy. For example, in FIGS. 3 and 4, the metadata module 220 receives mappings from each metadata object 310 to one or more data streams. The metadata module 220 determines the set of data streams associated with the metadata object 310a as the union of data streams mapped to metadata objects 310a, 301c, and 310e.

The hierarchical definition of the metadata objects makes it easy to assign data centers to various properties and also to define new metadata objects. The analytics engine 270 receives and processes expressions based on properties defined in metadata objects. The analytics engine 270 determines a set of data streams applicable to an expression. For example, if the analytics engine 270 receives an expression specifying computation of a $95^{th}$ percentile of all data streams that satisfy "critical:true", the analytics engine 270 determines the $95^{th}$ percentile of all data streams corresponding to metadata object 310a, i.e., the set 410a. If the analytics engine 270 receives an expression specifying computation of a $95^{th}$ percentile of all data streams that satisfy "critical:true" and "metric:errors", the analytics engine 270 determines the $95^{th}$ percentile of all data streams corresponding to metadata object 310c, i.e., the set 410c.

Whenever the metadata is modified, instrumentation analysis system 100 determines all data streams applicable to the modified metadata and updates index structures that associate metadata with data streams. For example, if a new tag (i.e., a property or name-value pair) is defined and associated with a set of data streams, the instrumentation analysis system 100 updates the indexes that associate the tag with the data streams. Note that a modification to a metadata object in the hierarchy of metadata objects (e.g., as shown in FIG. 3) at a high level in the hierarchy may affect multiple metadata objects below that metadata object in that hierarchy. The instrumentation analysis system 100 updates the indexes associating each of these metadata objects that is affected with the appropriate data streams.

Overall Process

Figure 5:
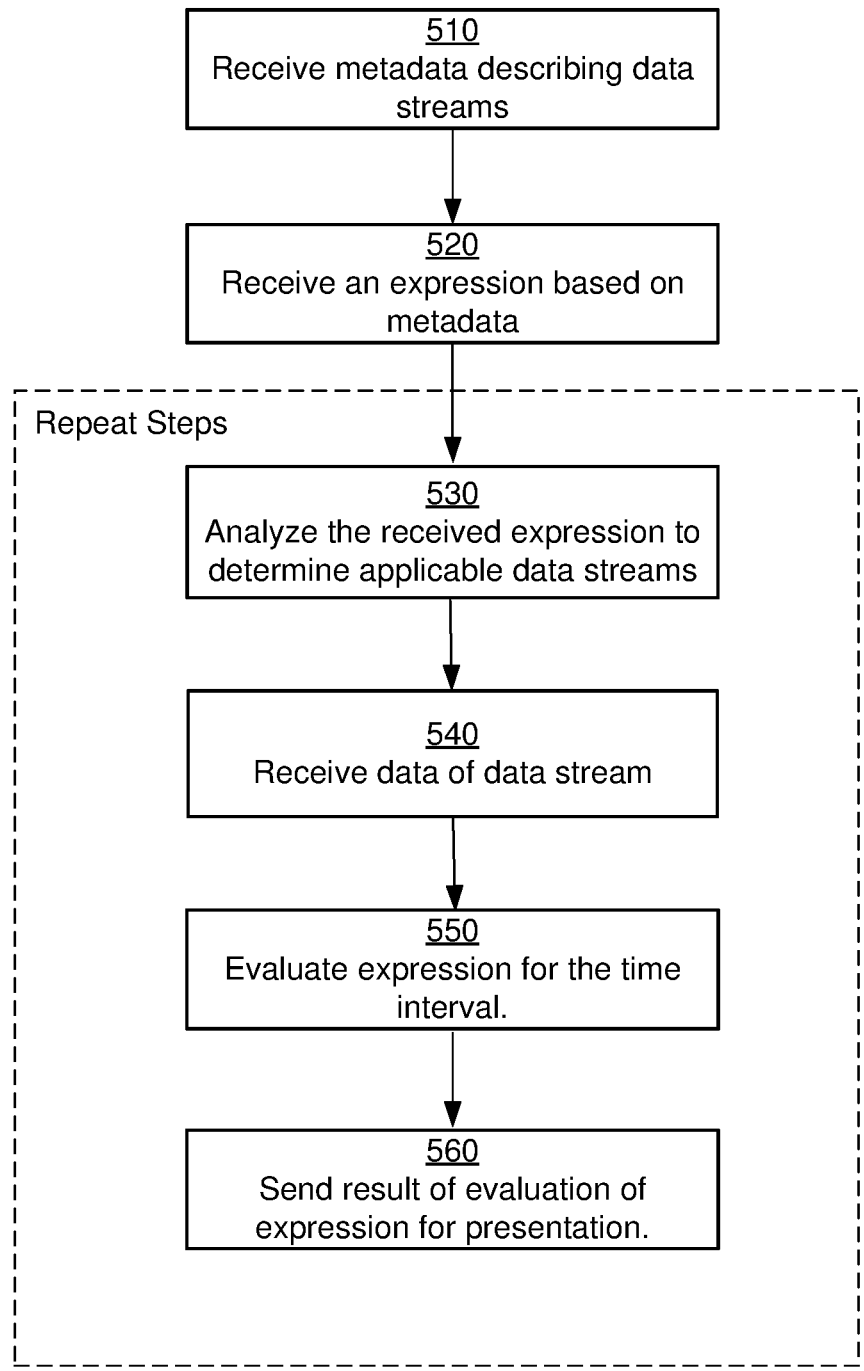
FIG. 5 shows an overall process for generating reports based on instrumented software, according to an embodiment.

FIG. 5 shows the overall process for generating reports based on instrumented software, according to an embodiment. The metadata module 220 receives 510 metadata describing data streams. The metadata definition is received independent of the data of the data streams themselves. For example, the data stream may provide tuples comprising a data value and a timestamp associated with the data value without providing values for attributes describing the data stream as specified in the metadata (for example, datacenter attribute.) The metadata module 220 receives the properties describing the data streams from a source different from the source providing the data stream. For example, the data streams are provided by instances of instrumented software that is executing, whereas the metadata definition is provided by a system administrator via the administration system 160.

The analytics engine 270 receives 520 an expression based on the metadata, for example, an expression that uses the properties specified in the metadata. The expression received 520 may be part of a query, for example, a query received by the instrumentation analysis system 100 to generate reports describing the instrumented software and provide the results in real-time, i.e., as the data of the data streams is received.

An example expression generates a value based on an aggregate of data from a plurality of data streams. For example, the expression may generate a value based on a fixed percentile of a data from a plurality of data streams, or the expression may generate a value that is a maximum (or minimum, or average, or any other statistical measure) of data from a plurality of data streams. Another example expressions aggregates data from a plurality of streams and groups the data values by a metadata attribute, thereby generating a plurality of output data streams (assuming the metadata attribute can take multiple data values and the plurality of input data streams include data streams associated with a plurality of data values of the metadata attribute.

The instrumentation analysis system 100 repeats the following steps (530, 540, 550, and 560) as data of various data streams is received by the instrumentation analysis system 100 from various development systems 120. The interface module 210 analyzes 530 the received expression to identify the data streams applicable to the expression. For example, in a particular time interval the interface module 210 may determine that a first set of data streams is applicable to the expression. However in a second (and subsequent) time interval, the interface module 210 may determine that a second set of data streams is applicable to the expression. For example, if the expression evaluates certain values based on data streams that arrive from datacenter "east" as specified using the property datacenter=east, the number of data streams received may increase (as new instances of software are executed by servers in the data center) or the number of data streams received may decrease (if some servers are down).

The interface module 210 analyzes 530 the expression periodically to identify all data streams applicable to the expression. In an embodiment, the rate at which the interface module 210 analyzes 530 the received expression is different from the rate at which the remaining steps 540, 550, and 560 are performed. For example, the rate at which the interface module 210 analyzes 530 the received expression may be slower than the rate at which the remaining steps 540, 550, and 560 are performed.

In an embodiment, the instrumentation analysis system 100 updates the set of data streams associated with an expression as soon as a data stream is available that is applicable to the expression. The instrumentation analysis system 100 maintains a representation of a set of data streams associated with each expression being evaluated. As soon as a new data stream is registered or data for a data stream is received that is applicable to an expression, the instrumentation analysis system 100, the instrumentation analysis system 100 adds the data stream to the set of data streams associated with the expression. Similarly, if a data stream is no longer applicable to the expression, the instrumentation analysis system 100 removes the data stream from the set of data streams associated with the instrumentation analysis system 100. For example, a data stream may not be associated with an expression if the metadata describing the data stream is modified. Accordingly, the instrumentation analysis system 100 does not have to evaluate the set of data streams applicable to an expression periodically. The set of data streams applicable to each expression is determined as soon as a change to the input data streams occurs that causes the data streams associated with an expression to change.

The interface module 210 receives 540 data points (represented as tuples of values) of different data streams. In an embodiment, the interface module 210 waits for a fixed interval of time, for example, 1 second or few seconds and collects all data received from different data streams during the fixed time interval. In an embodiment, the quantization module 240 performs quantization of the data for each time interval. Accordingly, data from each data stream is aggregated into a single value associated with the data stream for the time interval. A representation of the quantized data stream is maintained including an in-memory representation of data that arrives from the sources of the data stream as well as older data values that are stored as a data stream or time series in the time series data store 260.

The analytics engine 270 evaluates 550 the expression based on the data of the data streams for the time interval. If the data is quantized for each data stream, the analytics engine 270 evaluates 550 the expression using the quantized values from each data stream. The analytics engine 270 sends 560 the result(s) of evaluation of the expression for presentation, for example, to a user interface.

The analytics engine 270 also stores the output data stream (or data streams) obtained as a result of evaluating the expression, for example, in the time series data store 260. In an embodiment, the analytics engine 270 creates a new data stream representing the each output data stream obtained as a result of evaluating the expression. The new data stream is stored in the time series data store 260. This allows the result of the expression to be used as input to other expressions. For example, an expression may represent the $95^{th}$ percentile of values received as a plurality of data streams. The result of the expression may be stored in the time series data store 260 as a new data stream. The analytics engine 270 may further execute an expression that computes a moving average value based on the generated data stream.

In an embodiment, the instrumentation analysis system 100 executes a job (or process) to evaluate the received expression and execute the steps 530, 540, 550, and 560. This job dynamically evaluates a query to determine the instances of MTS objects (and the associated data streams) corresponding to an expression. All data streams that match the query based on the expression are determined. The data points of the matching data streams are considered while evaluating the expression.

Quantization

The instrumentation analysis system 100 performs quantization of the data streams by processing data streams having data values that arrive at irregular time intervals and generating an equivalent data stream that has data at regular time intervals. Data values of a data stream arrive at irregular time intervals if the time interval between two consecutive pairs of data values is different. For example, the time interval between arrival of values v1 and v2 is different from the time interval between arrival of values v2 and v3.

The quantization of input data streams simplifies processing of data using the quantized data streams. For example, aggregate values based on multiple data streams received can be determined for each time interval by simply aggregating the single data value for the time interval from each quantized data stream. Furthermore, the instrumentation analysis system 100 uses the same set of quantized data streams for evaluating different expressions corresponding to different reports. As a result, the computation performed for aggregating the data values for performing the quantization is reused for evaluation of each expression for each fixed time interval.

In an embodiment, the instrumentation analysis system 100 performs quantization of an input data stream at the end of each fixed time interval so that the quantized data for the time interval is available for processing for that fixed time interval. Furthermore, the instrumentation analysis system 100 stores the quantized data streams so that data across multiple data streams can be combined in various ways. In other words, a user may send a first request that combines data across a set of data streams in a first manner; subsequently the user may send a new request for combining the data across a different set of data streams in a different manner. If the two sets of data streams are overlapping, the data value for the time interval for the overlapping data streams can be reused for the two computations.

As an example, the instrumentation analysis system 100 may receive and process a report that combines data across a plurality of data streams to view aggregates computed over various data centers. However, subsequently the user may change the request to view aggregates computed over different types of applications, different types of servers, different geographical regions, and so on. The instrumentation analysis system 100 reuses the data values of the quantized data streams for each of these computations.

The instrumentation analysis system 100 may also receive a request in which the user modifies the set of data streams over which previous an expression aggregating data of data streams is evaluated. For example, the user may request the instrumentation analysis system 100 to remove one or more data streams from the set of data streams and request an aggregate based on the revised set. A user may send such a request to analyze the impact of removing or adding a new server, application, or making any other modification to the system configuration. The instrumentation analysis system 100 keeps the quantized data streams (or quantized time series data) and combines the quantized data streams for different time intervals based on these requests. Since the instrumentation analysis system 100 stores the quantized data streams, the instrumentation analysis system 100 has the ability to efficiently combine data across data streams as needed.

The instrumentation analysis system 100 can combine data across data streams to perform moving aggregate calculations across multiple data streams. The instrumentation analysis system 100 may continuously compute any moving aggregate value across a given length of time interval, for example, one hour moving average, a 15 minute moving average, and so on.

Architecture of Quantization Module

The quantization module 240 aggregates the values of the input data streams for each time interval and generates an aggregate value for the time interval. Accordingly, the quantization module 240 receives a data stream in which data values can occur after arbitrary time intervals. The quantization module 240 processes the input data stream to generate a data stream in which the data is available at regular time intervals. The details of the quantization module 240 are further described herein.

The quantization module 240 receives information describing the type of value received in the data stream, for example, whether the value is a count of certain action or entities, whether the value was obtained by an aggregation of certain value, whether the value represents a maximum/minimum value of a given set of values, and so on. A data stream is associated with a type of value describing the type of operations performed by the instrumented software to obtain the value. Examples of various types of values of data streams received and processed by quantization module 240 include values obtained as a result of performing statistical operations such as count (cardinality), average, median, percentile, latest value, and so on. The statistical operations are performed on values describing entities represented in instrumented software or actions performed by the instrumented software.

In an embodiment, the quantization module 240 stores a mapping from the various types of values of the data stream to the type of operation performed on the input values of the data stream for an interval to obtain the result value corresponding to a fixed time interval of the quantized data stream. The mapping may be stored as a structure or encoded within the instructions of the quantization module 240, for example, as a sequence of if, then, else commands. For example, the quantization module 240 may be configured to include instructions of the form, if the data stream is associated with a type of operation "count", then perform a first function, else if the data stream is associated with a type of operation "sum", then perform a second function, and so on.

In an embodiment, the quantization module 240 includes a buffer for storing data values that are received as input for a particular time interval. The buffer of the quantization module 240 uses a data structure configured to store arbitrary number of values since the number of values received in a time interval is not known in advance and can change from one time interval to another. For example, the quantization module 240 may use a list data structure or a stack data structure for storing the values of the input data stream.

The quantization module 240 collects the data values of the data stream received for each fixed time interval. The quantization module 240 stores a constant value L representing the length of the fixed time interval. The quantization module 240 tracks the time since a previous fixed time interval was closed to determine the length of the current time interval. The quantization module 240 compares the length of the current time interval with L to determine when the end of the current time interval is reached. The quantization module 240 processes all the data values received in the current time interval to determine the aggregate value representing the current time interval.

The quantization module 240 stores the aggregate value as representing the quantized data stream value for the fixed time interval corresponding to the current time interval. The quantization module 240 subsequently clears the buffer used for representing the input values of the current time interval and uses it to store the values for next fixed time interval. In an embodiment, the quantization module 240 uses multiple buffers so that while the data of a previous time interval stored in a buffer is being processed, new data for the next time interval can be stored in another buffer.

Figure 6:
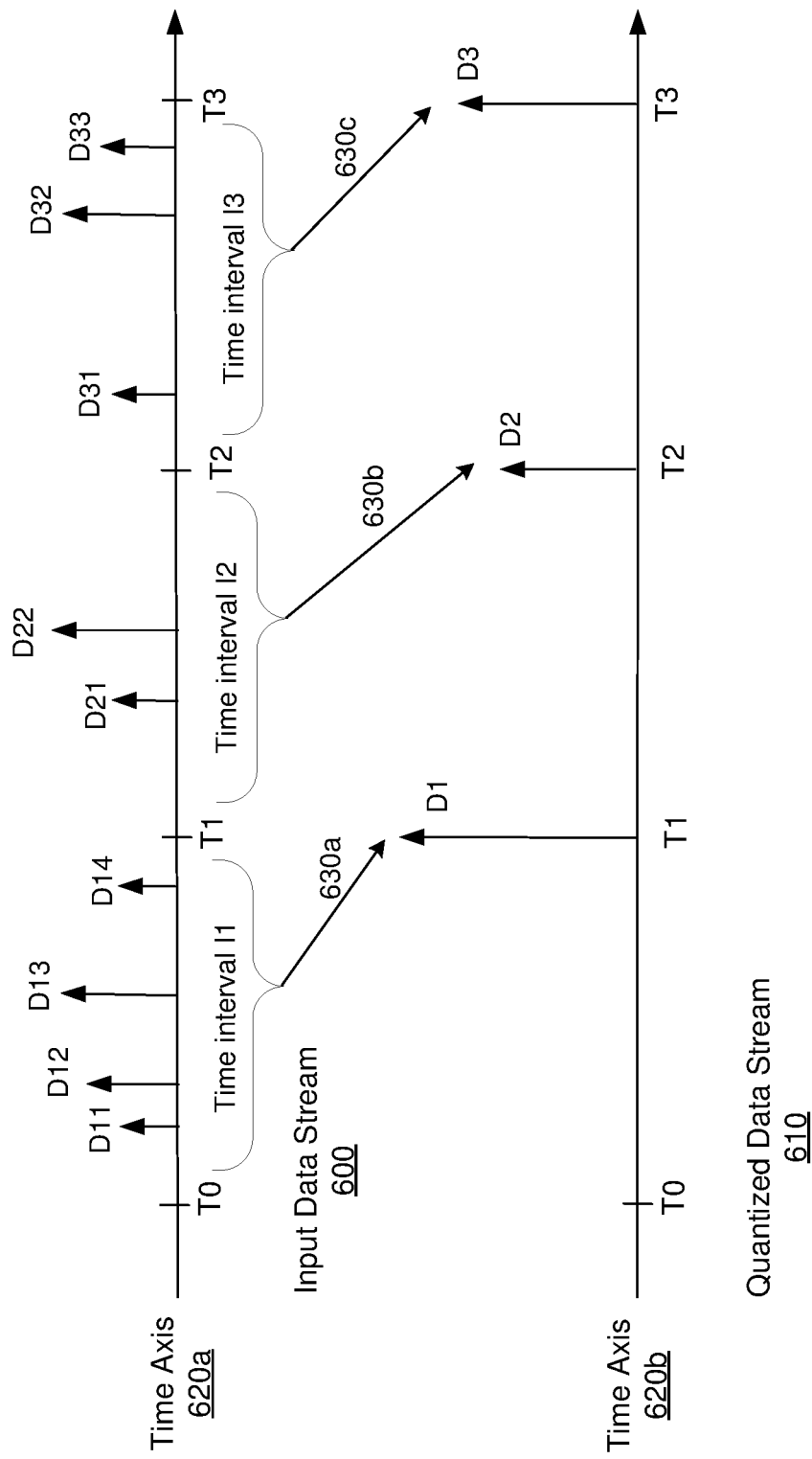
FIG. 6 illustrates a process of quantization of the data streams received from instrumented software, according to an embodiment.

FIG. 6 illustrates the process of quantization of the data streams received from instrumented software, according to an embodiment. FIG. 6 shows time axes 620a and 620b, each representing a time line with series of data values. The time axis 620a shows the data values of the input data stream 600 and time axis 620b shows the data stream of the resulting values of the quantized data stream 610 generated by the quantization module 240.

The time intervals I1, I2, I3, etc. represent the fixed time intervals corresponding to the quantized data stream. As shown in FIG. 6, four data values D11, D12, D13, and D14 are received in the time interval I1 (representing the time from T0 to T1); two data values D21 and D22 are received in the time interval I2 (representing the time from T1 to T2); and three data values D31, D32, and D33 are received in the time interval I3 (representing the time from T2 to T3).

A time interval between Tm and Tn may be assumed to include the start time point Tm (such that the end time point Tn is included in the next time interval). Any other interpretation of the time interval between Tm and Tn may be used, for example, the end time point Tn included in the time interval and the start time point Tm included in the previous time interval.

The quantization module 240 processes the data values of each time interval to generate the corresponding result value shown in the time axis 620b. For example, the quantization module 240 aggregates the values D11, D12, D13, and D14 received in the time interval I1 to generate the value D1 shown in time axis 620b; the quantization module 240 aggregates the values D21 and D22 received in the time interval I2 to generate the value D2 shown in time axis 620b; and the quantization module 240 aggregates the values D31, D32, and D33 received in the time interval I3 to generate the value D3 shown in time axis 620b.

In an embodiment, the quantization module 240 receives configuration parameters (for example, user defined configuration parameters) that define a quantization policy that defines how the data should be quantized. Different types of data maybe quantized differently. In other words, the type of operation performed to aggregate the input values of the data stream depends on the type of data represented by the input data stream.

If each tuple of the input data stream is a count of certain value, for example, a count of actions performed by the software, the quantization module 240 aggregates the input values to determine the output data stream value for each time interval by adding the counts. If each tuple of the input data stream received is a minimum (or maximum) of a set of values, the quantization module 240 aggregates the input values for a time interval to determine the output value for that time interval by determining the minimum (or maximum) of the input values for the time interval. If each tuple of the input data stream received is the latest value from a set of values, the quantization module 240 aggregates the input values for a time interval to determine the output value for that time interval by determining the latest of the input values for the time interval (and ignoring the previous values received during the time interval). If each tuple of the input data stream received is an average of a set of values, the quantization module 240 may aggregate the input values associated with the time interval to determine the output data stream value for each time interval by determining an average of the input values of the time interval. The average of a set of averages is not necessarily the average of the inputs used for determining the set of averages.

In an embodiment, the quantization module 240 aggregates the input values comprising a set of averages by selecting the latest value from the set. If each tuple of the input data stream received is the last available value of the metric at that point in time, the quantization module 240 aggregates the input values for the time interval to determine the output value for that time interval by simply using the last value of the data stream.

In an embodiment, the input data streams comprise data values representing averages of certain input values. Each data value is represented as a tuple that includes a count of the data values used to determine the average. The tuple may include an average value and a count of number of data values used to determine the average. The quantization module 240 determines an overall average value based on a plurality of tuples as follows. The quantization module 240 determines a sum value for each tuple by multiplying the average value with the count value. The quantization module 240 determines an overall sum value for a plurality of input tuples by determining adding the sum values for each tuple. The quantization module 240 determines an overall count value by adding the count values of the tuples. The quantization module 240 determines the overall average value by dividing the overall sum value by the overall count value.

Alternatively, each tuple may include a sum and a count of values used to determine the sum. The quantization module 240 can determine each individual average values corresponding to each tuple by dividing the sum value by the count value. The quantization module 240 combines the tuples to determine an overall average value as follows. The quantization module 240 adds all the sum values to determine an overall sum value. The quantization module 240 adds all the count values to determine an overall count value. The quantization module 240 determines the overall average value by dividing the overall sum value by the overall count value.

In some embodiments, the quantization module 240 performs rollup operations. The rollup operation corresponds to further aggregating data over larger time intervals (referred to herein as a rollup time interval). For example, assume that the quantization module 240 performs quantization so as to transform an input data stream with data arriving irregularly at various tine intervals to a data stream with data available at one second time interval. The quantization module 240 may further perform rollup operations to aggregate data across a larger time interval, i.e., the rollup time interval, for example, time intervals of one minute.

In an embodiment, the rollup operation is performed at the end of the rollup time interval. This allows the instrumentation analysis system 100 to keep rollup data ready for each data stream so that the instrumentation analysis system 100 can perform a rollup operation across multiple data streams efficiently. As described above, the instrumentation analysis system 100 can efficiently combine rollup data across multiple data streams in different ways, i.e., a different type of function used for rollup, a different combination of data streams, different sets across which rollup is performed. In an embodiment, the length of time intervals across which the quantization module 240 performs quantization or rollups is configurable.

Figure 7:
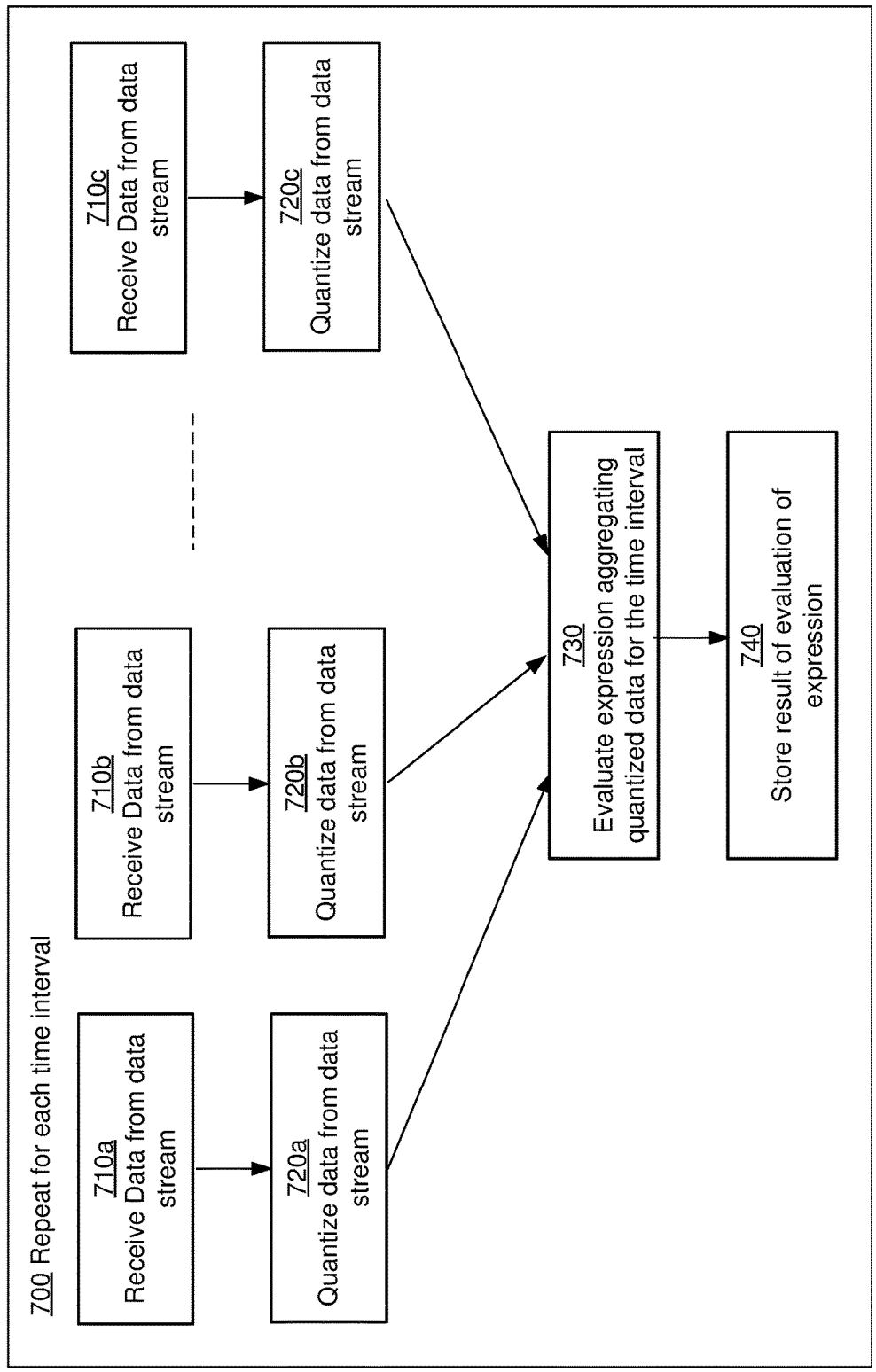
FIG. 7 shows an overall process for combining data of data streams received from various sources, according to an embodiment.

FIG. 7 shows the overall process for combining data of data streams received from various sources, according to an embodiment. Steps described herein may be performed by modules other than those indicated. Furthermore, certain steps may be performed in an order different from that indicated in FIG. 7.

This instrumentation analysis system 100 receives data streams from multiple development systems 120 and combines the data of the data stream as the data is received so as to generate reports based on the data in real-time. Accordingly, result values of the report corresponding to input data streams are generated and sent for presentation on an ongoing basis as the data is received. For example, the data values of data streams for each time interval are received and the result values computed and sent for presentation before the result value for the subsequent time interval are processed. Alternatively, the data values for the next time interval may be received and processed in parallel while the result values for the current time interval are sent for presentation. FIG. 7 shows the steps that are repeated for each time interval.

The interface module 210 receives 710 data from one or more data streams. For example, the interface module receives 710a, 710b, 710c data for a first data stream, second data stream, third data stream and so on. The quantization module 240 quantizes 720 data received for each data stream for a time interval. For example, the quantization module 240 quantizes 720a, 720b, 710c data for the first data stream, second data stream, third data stream and so on. Accordingly, a quantized aggregate value is generated based on the data value of each data stream received during the time interval.

The analytics engine 270 evaluates 730 an expression that aggregates the quantized data values corresponding to the data streams for the time interval. The expression may be specified using metadata describing the data streams stored in the metadata store 230. The analytics engine 270 stores 740 the result of evaluation of the expression in the time series data store 260. In an embodiment, the analytics engine 270 sends the output data stream obtained as a result of evaluation of the expression for presentation.

The above steps 710, 720, 730, and 740 are repeated by the instrumentation analysis system 100 for each subsequent time interval. As a result, a new data stream representing the result of the expression received by the analytics engine 270 is generated and stored in the time series data store 260. Furthermore, a result of the expression is sent for display in real-time for each fixed time intervals as the data for each time interval is received from the input data streams.

Alternative Embodiments

Although embodiments described herein disclose analysis of data streams received from instrumented software, the techniques disclosed herein apply to other types of data streams. For example, the instrumentation analysis system 100 may be used to analyze data streams representing data generated by sensors, data streams representing flight tracking information, data streams representing astronomical information generated by sensors, data streams representing weather information and so on. The instrumentation analysis system 100 allows users to define metadata attributes describing data streams that are not provided by the data streams themselves. Accordingly, any number of metadata attributes can be defined describing the data streams by a source independent of the sources of data streams themselves. Furthermore, the instrumentation analysis system 100 can receive specifications of expressions based on metadata attributes as well as attributes received as part of the data streams. Real time reports based on such expressions can be generated and presented via user interfaces.

In an embodiment, several sensors register with the instrumentation analysis system 100 providing information identifying each sensor. Each sensor sends a data stream to the instrumentation analysis system 100. The instrumentation analysis system 100 further receives metadata describing data streams that specifies attributes describing the data streams that are not provided with the data stream. For example, the metadata attribute may specify a geographic location of the sensor, may associate an organization or a group within the organization with the sensor, may associate one or more user names with each sensor, a manufacturer name with each sensor, and so on. The instrumentation analysis system 100 further receives expressions defining reports based on the sensor data and one or more metadata attributes. The instrumentation analysis system 100 quantizes each data stream based on a fixed time interval. The instrumentation analysis system 100 further evaluates the expression periodically and sends the results as an output data stream for display via a user interface.

An example report generated by the instrumentation analysis system 100 using the sensor data determines sum of data values received from the sensors grouped by various locations, for example, each location associated with a manufacturing facility, where the sensors provided data associated with certain manufacturing process. Another example report generated by the instrumentation analysis system 100 using the sensor data determines a count of active sensors grouped by manufacturers of each sensor, assuming the instrumentation analysis system 100 can differentiate active sensors from faulty sensors based on data streams received (or based of lack of data streams expected from a sensor.) An example report generated by the instrumentation analysis system 100 using the sensor data determines a measure of activity based on sensor data grouped by groups within an organization (assuming different sensors are associated with groups of the organization.) These examples illustrate how techniques disclosed herein can be applied to data streams received from sources other than instrumented software.

It is to be understood that the figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for processing data streams generated by instrumented software, the method comprising:
receiving a plurality of input data streams, each input data stream received from a separate instance of instrumented software executing on at least one external system, each input data stream providing values of a metric, the values generated by the instances of instrumented software at variable time intervals;
receiving a request to periodically evaluate an expression based on the plurality of input data streams;
for each input data stream, identifying a first function for aggregating values of the metric of the input data stream;
generating a plurality of quantized data streams based on the input data streams, each quantized data stream comprising data values occurring periodically at a first fixed time interval, the generating comprising, for each input data stream and for each first fixed time interval:
storing values of the metric of the input data stream received during the fixed time interval in a buffer;
determining a data value of the quantized data stream for the fixed time interval based on the values stored in the buffer by applying the identified first function for aggregating values over the values of the input data stream received within the first fixed time interval and stored in the buffer; and
sending the determined data value as the data value of the quantized data stream for the first fixed time interval;
periodically evaluating the expression based on data values of at least two of the plurality of quantized data streams to generate an output data stream, the evaluating comprising repeatedly:
applying a second function to the data values of the quantized data streams, each data value associated with a second fixed time interval, the second function aggregating values over the quantized data streams; and
sending the output data stream for display via a user interface.

2. The method of claim 1, wherein the expression determines aggregate values over groups of quantized data streams, each group associated with a value of a metadata attribute describing the data streams.

3. The method of claim 1, wherein the data of an input data stream is generated by an instruction executed by the instrumented software, the instruction associated with one of a counter or a gauge.

4. The method of claim 1, the method further comprising: sending the output data stream for display as a chart updated for the second fixed time interval.

5. The method of claim 1, further comprising: reusing the buffer for storing the data values of the data stream received during a subsequent fixed time interval.

6. The method of claim 1, further comprising:
determining a rollup time interval, wherein the rollup time interval is larger than the first fixed time interval; and
determining a rollup data stream corresponding to each quantized data stream, the determining comprising:
determining an aggregate value by applying the identified first function to all data values of the quantized data stream generated within the rollup time interval, and
storing the aggregate value as a value of the rollup data stream for the rollup time interval.

7. The method of claim 1, wherein the plurality of input data streams comprises a first input data stream and a second input data stream, and a number of data values of a first input data stream received during a particular fixed time interval is different from a number of data values received for a second input data stream during the particular fixed time interval.

8. The method of claim 1, wherein a number of data values of an input data stream received during a particular fixed time interval is different from a number of data values received for the input data stream during a subsequent fixed time interval.

9. The method of claim 1, wherein identifying the first function for aggregating values of the metric of the input data stream comprises:
receiving information indicating that a metric for a data stream represent a count value; and
determining that the identified first function for the data stream is a sum function.

10. The method of claim 1, wherein identifying the first function for aggregating values of the metric of the input data stream comprises:
receiving information indicating that a metric for a data stream represents a sum value; and
determining that the identified first function for the data stream is a sum function.

11. The method of claim 1, wherein identifying the first function for aggregating values of the metric of the input data stream comprises:
receiving information indicating that a metric for a data stream represent a latest value; and
determining that the identified first function for the data stream selects a latest value of a set of data values received in a time interval.

12. The method of claim 1, wherein identifying the first function for aggregating values of the metric of the input data stream comprises:
receiving information indicating that a metric for a data stream represent an average value; and
determining that the identified first function for the data stream is an average function.

13. The method of claim 1, wherein identifying the first function for aggregating values of the metric of the input data stream comprises:
receiving information indicating that a metric for a data stream represent an average value, each data value comprising a tuple having the average value and a count of data values used for the average; and
determining that the identified first function for the data stream for a time interval:
determines a product of each average value and count value received during the time interval,
determines a sum of the product values, and
determines a ratio of the sum of the product values and a sum of all count values.

14. The method of claim 1, wherein identifying the first function for aggregating values of the metric of the input data stream comprises:
receiving information indicating that a metric for a data stream represent an average value, each data value comprising a tuple having a sum of data values and a count of data values used for the sum; and
determining that the identified first function for the data stream for a time interval:
determines a sum of all the sum values received during the time interval, and
determines a ratio of the sum values and a sum of all count values.

15. The method of claim 1, wherein identifying the first function for aggregating values of the metric of the input data stream comprises:
receiving information indicating that a metric for a data stream represent a maximum value; and
determining that the identified first function for the data stream determines a maximum of data values received within a time interval.

16. The method of claim 1, wherein identifying the first function for aggregating values of the metric of the input data stream comprises:
receiving information indicating that a metric for a data stream represent a minimum value; and
determining that the identified first function for the data stream determines a minimum of data values received within a time interval.

17. The method of claim 1, wherein the expression determines one of: a percentile value, an average value, a minimum value, a maximum value, a sum value, or a moving average value.

18. A computer readable non-transitory storage medium storing instructions for processing data generated by instrumented software, the instructions executable by a processor to perform operations comprising:
receiving a plurality of input data streams, each input data stream received from a separate instance of instrumented software executing on at least one external system, each input data stream providing values of a metric generated by the instances of instrumented software at variable time intervals;
receiving a request to periodically evaluate an expression based on the plurality of input data streams;
for each input data stream, identifying an aggregation function based on the metric of the input data stream;
generating a plurality of quantized data streams based on the plurality of input data streams, each quantized data stream comprising data values occurring periodically at a first fixed time interval, the generating comprising, for each first fixed time interval, for each input data stream:
storing values of the metric of the input data stream received during the first fixed time interval in a buffer;

determining an aggregate value for the input data stream based on the values stored in the buffer by applying the identified aggregation function over data values of the input data stream received within the first fixed time interval; and sending the determined data value as the data value of the quantized data stream for the first fixed time interval;

periodically evaluating the expression based on data values of the plurality of at least two of the plurality of quantized data streams to generate an output data stream, the evaluating comprising repeatedly:

applying a second function to the data values of the quantized data streams, each data value associated with a second fixed time interval, the second function aggregating values over the quantized data streams; and sending the output data stream for display via a user interface.

19. A computer-implemented system for processing data generated by instrumented software, the system comprising:

a computer processor; and a computer readable non-transitory storage medium storing instructions thereon, the instructions executable by a processor to perform operations comprising:

receiving a plurality of input data streams, each input data stream received from a separate instance of instrumented software executing on at least one external system, each input data stream providing values of a metric generated by the instances of instrumented software at variable time intervals;

receiving a request to periodically evaluate an expression based on the plurality of input data streams;

for each input data stream, identifying an aggregation function based on the metric of the input data stream;

generating a plurality of quantized data streams based on the plurality of input data streams, each quantized data stream comprising data values occurring periodically at a first fixed time interval, the generating comprising, for each first fixed time interval, for each input data stream:

storing values of the metric of the input data stream received during the first fixed time interval in a buffer;

determining an aggregate value for the input data stream based on the values stored in the buffer by applying the identified aggregation function over data values of the input data stream received within the first fixed time interval; and sending the determined data value as the data value of the quantized data stream for the first fixed time interval;

periodically evaluating the expression based on data values of at least two of the plurality of quantized data streams to generate an output data stream, the evaluating comprising repeatedly:

applying a second function to the data values of the quantized data streams, each data value associated with a second fixed time interval, the second function aggregating values over the quantized data streams; and sending the output data stream for display via a user interface.

* * * * *